(12) United States Patent
Dombek et al.

(10) Patent No.: US 11,112,001 B2
(45) Date of Patent: Sep. 7, 2021

(54) ASSEMBLY COMPRISING A LUBRICATING WHEEL AND LUBRICANT NOZZLES FOR A PLANETARY GEAR SPEED REDUCER OF A TURBOMACHINE

(71) Applicant: SAFRAN TRANSMISSION SYSTEMS, Colombes (FR)

(72) Inventors: Alexis Claude Michel Dombek, Moissy-Cramayel (FR); Jean-Charles Michel Pierre Di Giovanni, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/631,103

(22) PCT Filed: Jul. 16, 2018

(86) PCT No.: PCT/FR2018/051808
§ 371 (c)(1),
(2) Date: Jan. 14, 2020

(87) PCT Pub. No.: WO2019/016463
PCT Pub. Date: Jan. 24, 2019

(65) Prior Publication Data
US 2020/0132186 A1    Apr. 30, 2020

(30) Foreign Application Priority Data
Jul. 20, 2017   (FR) .................................... 1756894

(51) Int. Cl.
*F16H 57/04*   (2010.01)
*F16H 57/08*   (2006.01)
(Continued)

(52) U.S. Cl.
CPC ......... *F16H 57/0482* (2013.01); *F01D 25/18* (2013.01); *F02C 7/36* (2013.01);
(Continued)

(58) Field of Classification Search
CPC . F16H 57/082; F16H 57/0479; F16H 57/0456
See application file for complete search history.

(56) References Cited

U.S. PATENT DOCUMENTS 8,820,478 B2    9/2014  Gauthier et al.
8,876,647 B2    11/2014 Gallet et al.
(Continued)

FOREIGN PATENT DOCUMENTS

FR    2987416 A1    8/2013
FR    3036763 A1    12/2016
(Continued)

OTHER PUBLICATIONS

Written Opinion of the International Searching Authority dated Oct. 19, 2018, issued in corresponding International Application No. PCT/FR2018/051808, filed Jul. 16, 2018, 7 pages.
(Continued)

*Primary Examiner* — Derek D Knight
(74) *Attorney, Agent, or Firm* — Christensen O'Connor Johnson Kindness PLLC

(57) ABSTRACT

An assembly comprising a lubricating wheel and lubricant nozzles for a planetary gear speed reducer of a turbomachine, the wheel having a lubricator configured to supply lubricant to the nozzles and the bearings of the planetary carriers of the reducer, the wheel being intended to be mounted coaxially on an annular wall of an axis of rotation X of a planetary carrier of the reducer, the wheel having a bearing and attachment surface on the annular wall of the planetary carrier, the lubricant nozzles being distributed around the axis and each having a generally elongated shape,
(Continued)

the nozzles having first longitudinal ends for fluidly connecting to the lubricator of the wheel, wherein the first ends of the nozzles being configured to be attached to the wheel before mounting the wheel on the annular wall of the planetary carrier.

11 Claims, 3 Drawing Sheets

(51) Int. Cl.
  *F01D 25/18* (2006.01)
  *F02C 7/36* (2006.01)
(52) U.S. Cl.
  CPC ..... *F16H 57/0431* (2013.01); *F16H 57/0456* (2013.01); *F16H 57/0479* (2013.01); *F16H 57/082* (2013.01); *F05D 2220/323* (2013.01); *F05D 2250/11* (2013.01); *F05D 2250/12* (2013.01); *F05D 2250/13* (2013.01); *F05D 2260/40311* (2013.01); *F05D 2260/98* (2013.01)

(56) References Cited

U.S. PATENT DOCUMENTS

| | | | |
|---|---|---|---|
| 10,458,279 B2 * | 10/2019 | Gedin | ............... F02C 7/06 |
| 2012/0028756 A1 | 2/2012 | Lopez et al. | |

FOREIGN PATENT DOCUMENTS

| | | |
|---|---|---|
| FR | 3041054 A1 | 3/2017 |
| WO | 2010/092263 A1 | 8/2010 |
| WO | 2014/099087 A2 | 6/2014 |

OTHER PUBLICATIONS

International Preliminary Report on Patentability dated Jan. 21, 2020, issued in corresponding International Application No. PCT/FR2018/051808, filed Jul. 16, 2018, 1 page.

International Search Report dated Oct. 19, 2018, issued in corresponding International Application No. PCT/FR2018/051808, filed Jul. 16, 2018, 2 pages.

* cited by examiner

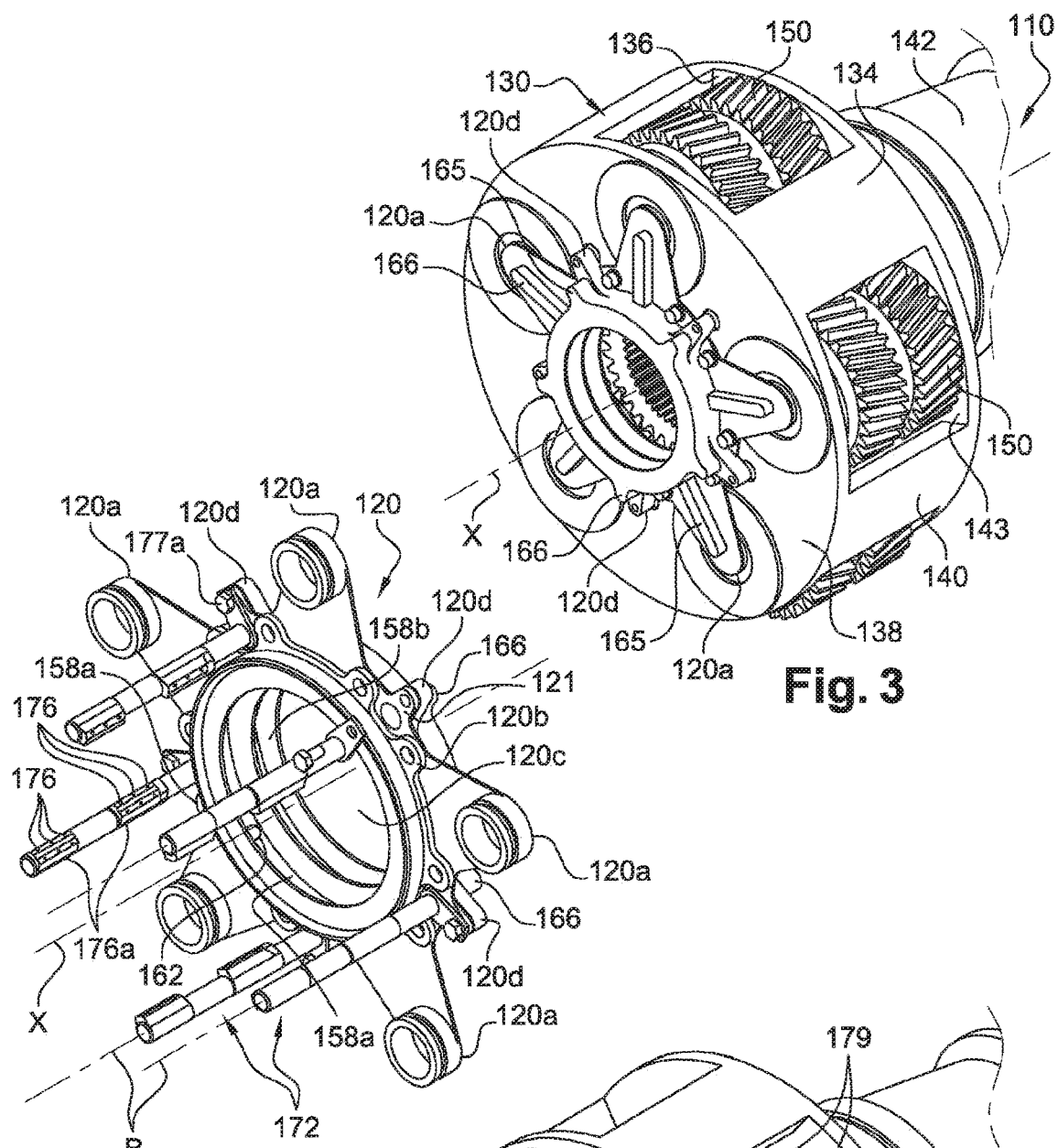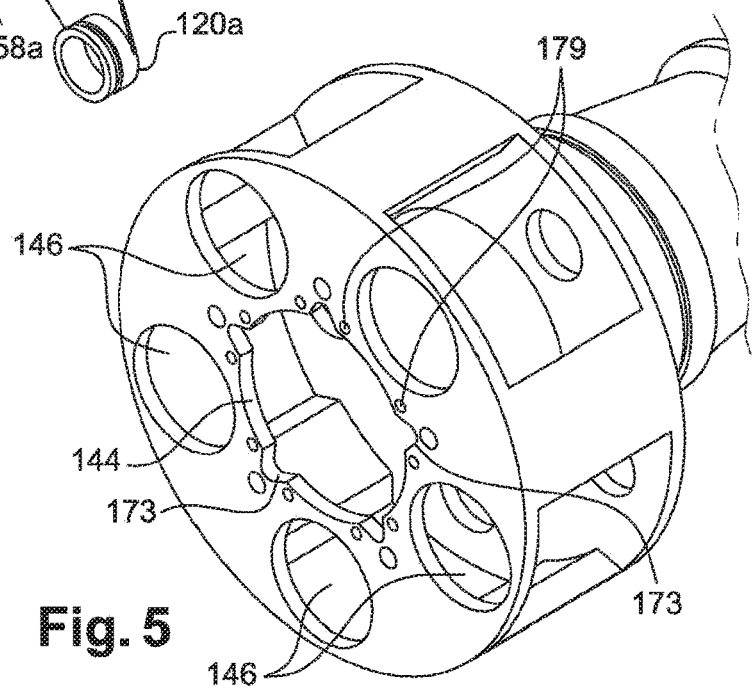

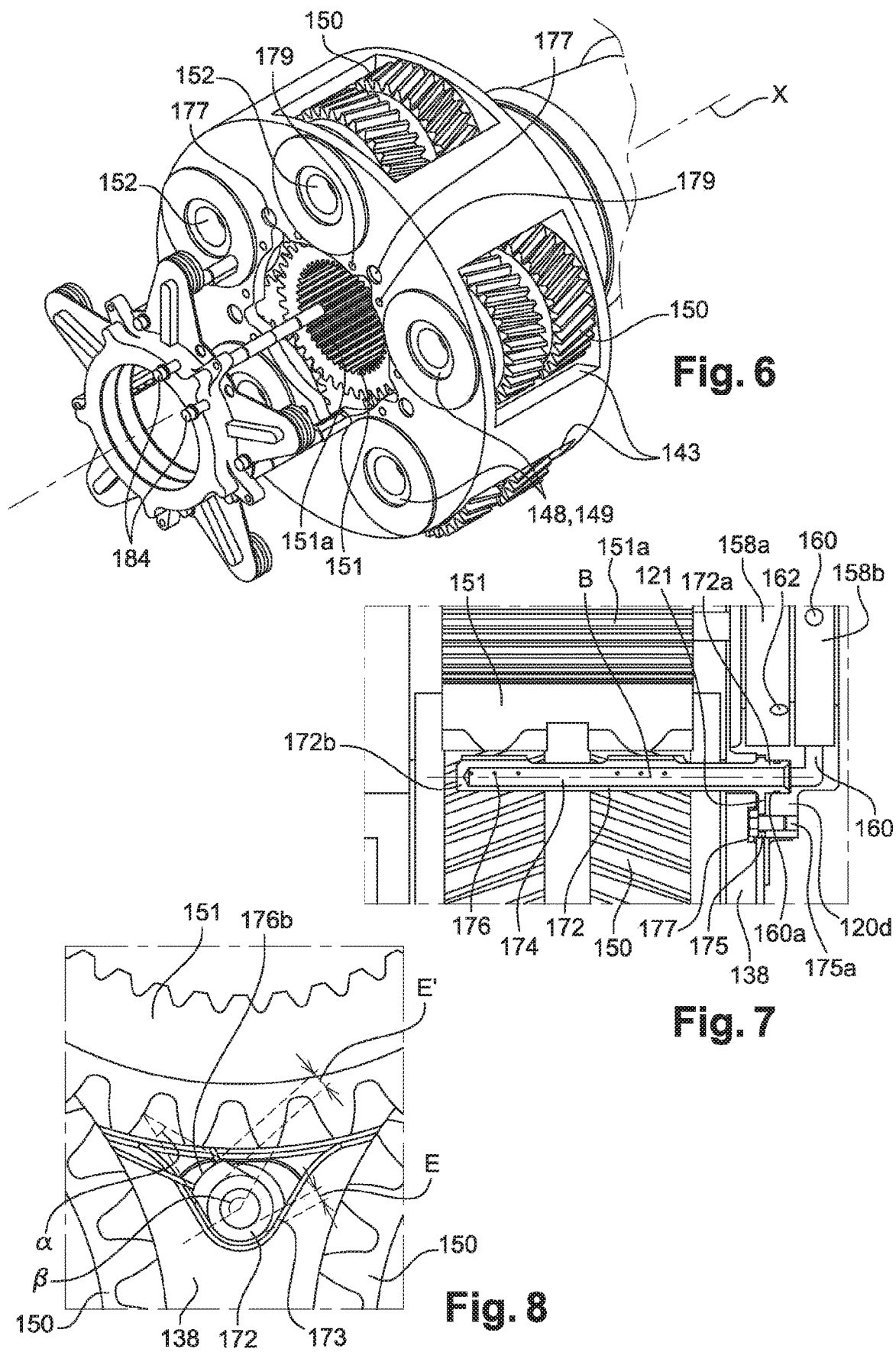

ASSEMBLY COMPRISING A LUBRICATING WHEEL AND LUBRICANT NOZZLES FOR A PLANETARY GEAR SPEED REDUCER OF A TURBOMACHINE

FIELD OF THE INVENTION

The present invention relates to the field of planetary gear speed reducers for turbine engines, in particular aircraft turbine engines, as well as elements which form a reducer of this type such as nozzles, a planetary carrier, a wheel, etc.

STATE OF THE ART

The state of the art comprises, in particular, the documents WO-A1-2010/092263, FR-A1-2 987 416, FR-A1-3 036 763, WO-A2-2014/099087, US-A1-2012/028756 and FR-A1-3 041 054.

Current turbine engines, in particular turbine engines comprising one or more propellers blowing a secondary flow, comprise a transmission system, termed reducer, to drive this or these blades at the correct rotation speed from the shaft of the power turbine of the primary body of the engine.

The functioning of the reducers, in particular on turbine engines with a fan blade with a high dilution rate, requires a particularly high oil flow, of around 6,000 to 7,000 litres per hour on take-off, to ensure the lubrication and the cooling of the pinions and bearings thereof.

Amongst the reducers used, are found planetary and (planetary gear speed) reducers, which have the advantage of offering significant reduction rates of the rotation speed in reduced volumes.

Such a reducer comprises a planetary pinion or central pinion, termed sun gear, an outer ring gear and planetary carrier pinions, termed planetary carriers, which are engaged with the sun gear and with the ring gear, the support of one of these three components having to be blocked in rotation for the functioning of the gear train.

When the planetary carrier is rotatably attached, the sun gear and the ring gear are driving and driven, respectively, or conversely. The reducer is thus of the "planetary" type.

In the opposite case, most frequently, of a planetary gear reducer, the outer ring gear is attached in rotation and the sun gear and the planetary carrier are driving and driven.

However, this type of reducer has disadvantages. One of the problems is linked to the correct lubrication of the gearings of the planetary carriers and of the sun gear. The oil must pass from an attached portion of the engine to a high-speed rotating portion. Once in the rotating portion, the oil is no longer pressurised. At high speed, it is difficult to reach the sun gear with the oil, due to the centrifugal effect. It is thus essential to bring the nozzle closer to the sun gear. Another of the problems is linked to the complexity of the mounting.

The present invention proposes an improvement which brings a simple, effective and economical solution to at least some of these problems.

SUMMARY OF THE INVENTION

According to a first aspect, the invention relates to a lubricant nozzle for a planetary gear speed reducer of a turbine engine, said nozzle having a generally elongate shape and comprising a body of longitudinal axis B, said body comprising an inner longitudinal cavity which is in fluid communication with a lubricant inlet situated at a longitudinal end of said body and with outlet lubricant orifices which are formed in an annular wall of said body and which extend substantially radially with respect to said axis B, characterised in that said orifices are formed in at least one boss of said body, which protrudes radially outwards on said wall and which has an angular extent about said axis B less than or equal to 360°.

As opposed to the prior art, a nozzle thus has more material at the level of the oil projection orifices. This addition of material has the shape of a boss at the top of which the orifices open. The orifices thus have a radial dimension greater than those of the orifices of a nozzle according to the prior art and have the radially outer ends thereof which are at a greater radius and can be brought closer to the gearings to be lubricated. The oil passing through the orifices is guided over a longer distance and is projected closest to the gearings, which significantly optimises the lubrication of the reducer.

The nozzle according to the invention can comprise one or more of the following features, taken individually from one another, or combined with one another:

the at least one boss has, in the transverse cross-section, a generally trapezium shape of which the small base is defined by the radially outer end of the boss on which said orifices open; the shape of the boss is thus optimised to convey the oil as close as possible to the gearings to be lubricated;

the edges of said trapezium together form an angle of between 0 and 90°, the volume of the bosses is thus reduced;

the small base of said trapezium has a convex curved shape;

said at least one boss comprises at least one row of orifices per element to be lubricated; it comprises, for example, two rows each comprising several orifices; in a variant, the orifices could have another arrangement;

said body comprises at least two bosses at a longitudinal distance from one another; the bosses are situated in favoured zones of the body of the nozzle in order to optimise the lubrication of the gearings while optimising the volume and the mass of the nozzle; in this case, the favoured zone is defined by the number and the width of the blades of the gearings; a material extension can be added onto these bosses; this makes it possible, after production, to remove the material to obtain an almost identical mass on each nozzle in order to limit the imbalance of the reducer;

the nozzle comprises an attachment tab formed of one single part with the body, said tab extending substantially in a plane perpendicular to said axis and comprising an orifice for the passage of an attachment means of the screw-nut type; the body of the nozzle thus has a relatively simple shape, which limits the production cost thereof;

said body comprises at least one outer annular recess for housing an annular seal.

According to another aspect, the invention relates to a planetary carrier for a planetary gear speed reducer of a turbine engine, said planetary carrier comprising a cage defining an inner space for mounting a central sun gear of axis X of rotation and an annular row of planetary carriers arranged about the axis X and meshed with said sun gear, said sun gear comprising means for coupling to a first shaft, said cage comprising two substantially parallel annular walls centred on said axis X and a cylindrical wall connecting said annular walls to the outer periphery thereof, a first of said annular walls being connected to a substantially cylindrical body comprising means for coupling to a second shaft, and a second of said annular walls comprising passages for the mounting of nozzles, by moving each nozzle in a direction substantially parallel to said axis X, characterised in that each of said passages has a generally triangular or trapezoidal shape to enable the movement of the boss(es) bodies of each nozzle.

Advantageously, said passages are notches formed in an inner peripheral edge of said second annular wall, the base of the triangle or the large base of the trapezium of each of these passages being situated at the level of said peripheral edge.

According to another aspect, the invention relates to an assembly comprising a planetary carrier and nozzles such as described above, the nozzles passing through said passages, characterised in that the or each boss of each nozzle is oriented towards the base of the triangle or the large base of the trapezium of the passage passed through by this nozzle.

According to another aspect, the invention relates to an aircraft turbine engine, characterised in that it comprises at least one nozzle, a planetary carrier or an assembly such as described above.

According to another aspect, the invention relates to an assembly comprising a lubrication wheel and lubricant nozzles, for a planetary gear speed reducer of a turbine engine, the wheel comprising lubrication means configured to bring the lubricant to the nozzles and to the bearings of the planetary carriers of said reducer, said wheel being intended to be mounted coaxially on an annular wall of axis X of revolution of a planetary carrier of said reducer, said wheel comprising an attachment surface on this annular wall of the planetary carrier, said lubricant nozzles being distributed about said axis X and each having a generally elongated shape, said nozzles comprising first longitudinal ends fluidly connecting to said means for lubricating said wheel, characterised in that said first ends of said nozzles comprise means for attaching to said wheel, said nozzles being configured to be attached to said wheel before the mounting of the wheel on said annular wall of the planetary carrier.

The invention thus proposes a new technology for mounting a planetary carrier. The nozzles of the latter are not mounted last on the assembly formed by the planetary carrier and the wheel but, on the contrary, are first pre-mounted on the wheel before returning and attaching the assembly on the planetary carrier.

Said assembly according to the invention can comprise one or more of the following features, taken individually from one another, or combined with one another:
  each nozzle comprises a tab for attaching to said wheel, said tab extending in a plane substantially perpendicular to an elongation axis of the nozzle and being applied and attached on said attachment surface of said wheel or a recess provided on this attachment surface; said tab is preferably formed of one single part with a body of said nozzle; this allows to simplify the production of the nozzles, the nozzles being simply attached by the tabs which ensure a correct positioning of the functioning nozzles;
  each nozzle comprises, opposite said first end, a second free end;
  the nozzles are thus mounted cantilevered, even if the contrary can be considered;
  each nozzle comprises an inner longitudinal cavity opening at said first end and closed at said second end; each nozzle therefore does not require any sealing plug at the end thereof opposite the connection end thereof, which is advantageous, as this reduces the production cost thereof, as well as the risk of leakage;
  said assembly further comprises a planetary carrier which comprises a cage defining an inner space for mounting a central sun gear of axis X of rotation and an annular row of planetary carriers arranged about the axis X and meshed with said sun gear, said sun gear comprising means for coupling to a first shaft, said cage comprising two substantially parallel annular walls centred on said axis X and a cylindrical wall connecting said annular walls to the outer periphery thereof, a first of said annular walls being connected to a substantially cylindrical body comprising means for coupling to a second shaft, and a second of said annular walls comprising a surface for receiving said attachment surface of said wheel;
  said receiving surface comprising a recess or counterbore for housing said tab of each nozzle, or a means for attaching this tab; the tab thus does not impede the contact between the surfaces of the wheel and of the second wall, which makes it possible to guarantee a correct relative positioning of these parts; in addition, the tab is confined between these surfaces, which gives the nozzles a captive character and secures the assembly;
  said second wall comprises an annular row of orifices or notches for the passage of said nozzles during the mounting of the wheel equipped with nozzles on said second wall; due to the low volume of the nozzles, the orifices or notches having restricted dimensions and suitable shapes are provided on said second wall;
  said orifices or said notches have a generally triangular or trapezoidal shape;
  said nozzles are attached to the wheel by screws screwed in the tapped orifices of the wheel.

According to another aspect, the invention relates to a method for assembling a planetary carrier such as described above, wherein it comprises steps of:
  attaching said nozzles to said wheel;
  mounting said wheel equipped with nozzles on said second wall.

Advantageously, said wheel is mounted on said second wall by making said nozzles pass through orifices or notches of said second wall.

The shape of these notches allows to mould the transversal shape of the nozzles and more specifically, that of the bosses thereof mentioned above. The fixing screw heads of the nozzles can be housed in counterbores of the planetary carrier.

Preferably, said wheel is attached to said second wall by means of screws which are screwed in orifices of said wheel and in aligned tapped holes of said second wall.

Preferably, said wheel is attached to said second wall by screws, of which two are arranged on either side of each nozzle and are screwed in tapped holes of said second wall.

BRIEF DESCRIPTION OF THE FIGURES

Other features and advantages will emerge from the following description of a non-limiting embodiment of the invention in reference to the appended drawings, wherein:

FIG. 3 is a schematic, perspective view of an embodiment of a planetary gear reducer, FIG. 4 is a schematic, perspective view of an assembly comprising a wheel and nozzles of the reducer of FIG. 3, FIG. 5 is a schematic, perspective view of a planetary carrier of the reducer of FIG. 3, FIG. 6 is another schematic, perspective view of the reducer of FIG. 3, and shows an assembly step, FIG. 7 is a schematic, partial, axial, cross-sectional view and on a greater scale of a detail of the reducer of FIG. 3, and in particular, of a nozzle of the reducer, and FIG. 8 is a schematic, partial, transversal, cross-sectional view and on a greater scale of a detail of the reducer of FIG. 3, and in particular, of a nozzle of the reducer.

DETAILED DESCRIPTION OF AN EMBODIMENT OF THE INVENTION

Figure 1:
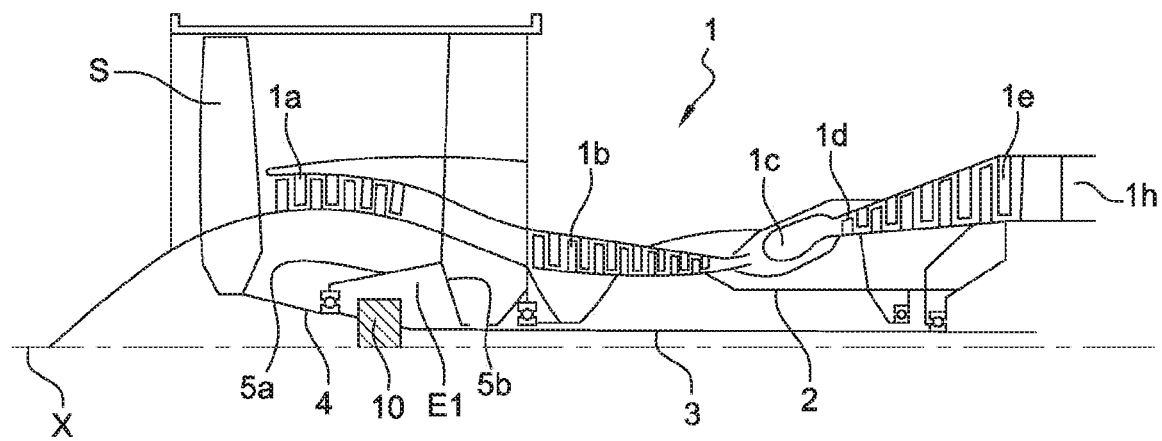
FIG. 1 is a schematic, axial, cross-sectional view of a turbine engine using the invention.

FIG. 1 shows a turbine engine 1 which comprises, conventionally, a fan blade S, a low-pressure compressor 1a, a high-pressure compressor 1b, an annular combustion chamber 1c, a high-pressure turbine 1d, a low-pressure turbine 1e and an exhaust pipe 1h. The high-pressure compressor 1b and the high-pressure turbine 1d are connected by a high-pressure shaft 2 and form with it, a high-pressure (HP) body. The low-pressure compressor 1a and the low-pressure turbine 1e are connected by a low-pressure shaft 3 and form with it, a low-pressure (LP) body.

The fan blade S is driven by a fan shaft 4 which is coupled to the LP shaft 3 by means of a planetary gear reducer 10 represented here schematically.

The reducer 10 is positioned in the front portion of the turbine engine. An attached structure schematically comprising, here, an upstream portion 5a and a downstream portion 5b is arranged so as to form an enclosure E1 surrounding the reducer 10. This enclosure E1 is here closed upstream by seals at the level of a bearing allowing the duct of the fan shaft 4, and downstream by seals at the level of the duct of the LP shaft 3.

Figure 2:
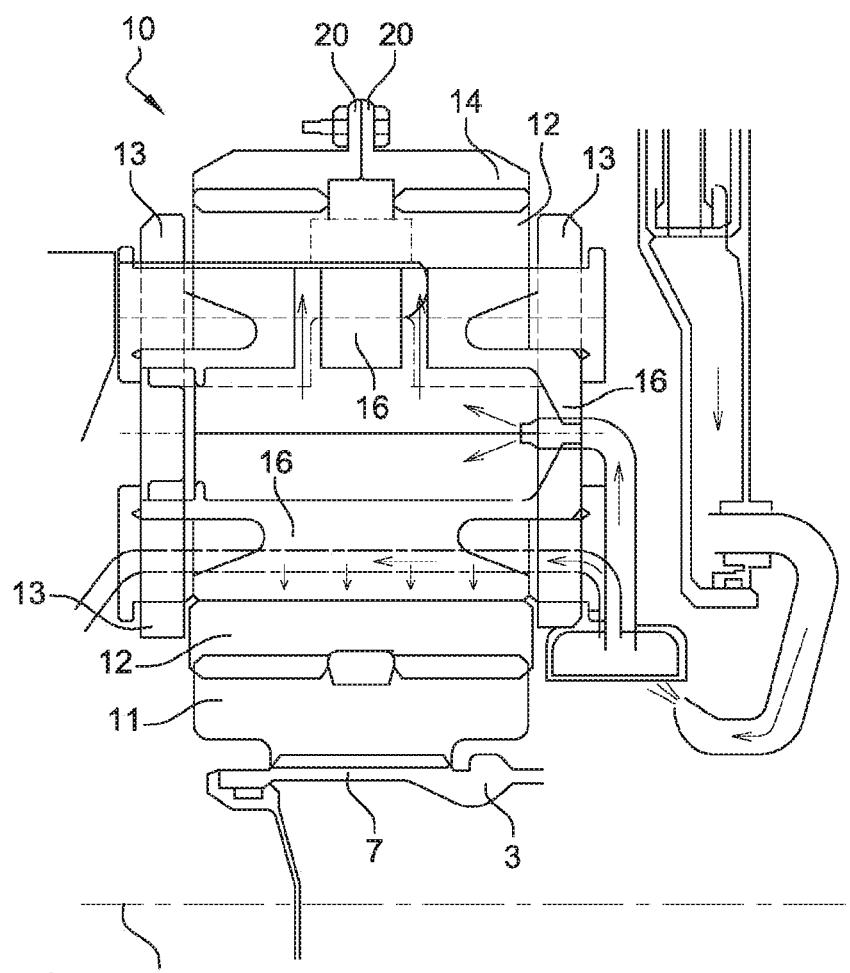
FIG. 2 is a schematic, axial, cross-sectional view of a planetary gear reducer.

In reference to FIG. 2, the reducer 10 comprises a gear ring 14 which is attached by way of a ring gear carrier (not represented) to the attached structure 5a, 5b with flexible means arranged to allow it to follow possible movements of the fan shaft 4, in certain degraded functioning cases, for example. In a planetary architecture, the ring gear carrier comprises a more or less flexible portion which drives the ring gear and a shaft portion maintained by rollers or bearings and on which the fan is mounted. These attachment means are known to a person skilled in the art and are not detailed here. A brief description can be found about this, for example in FR-A1-2987416.

The reducer 10 starts, on the one hand, on the LP shaft 3 by way of slots 7 which drive a planetary gear pinion or sun gear 11, and on the other hand, on the fan shaft 4, which is attached to a planetary carrier 13. Conventionally, the sun gear 11, of which the axis of rotation X is combined with that of the turbine engine, drives a series of planetary carrier pinions or planetary carriers 12, which are regularly distributed over the circumference of the reducer 10. The number of planetary carriers 12 is generally defined between three and six. The planetary carriers 12 also rotate about the axis X of the turbine engine, except for in the case of a planetary carrier where they only rotate about the axes of rotation thereof, by meshing on inner gearings of the ring gear 14, which is attached to a stator of the turbine engine by way of flanges 20 in the case of a planetary gear or attached to a rotor of the turbine engine in the case of a planetary carrier. Each of the planetary carriers 12 rotates freely about a planetary carrier axis 16 connected to the planetary carrier 13, using a bearing which can be smooth, as represented in FIG. 2, or a bearing with rolling elements (ball bearings or roller bearings).

The rotation of the planetary carriers 12 about the planetary carrier axis 16 thereof, due to the engagement of the pinions thereof with the gearings of the ring gear 14, drives the rotation of the planetary carrier 13 about the axis X, and consequently that of the fan shaft 4 which itself is linked, at a rotation speed which is less than that of the LP shaft 3.

FIG. 2 shows the pathway of oil to the reducer 10 and the passage thereof inside it. Arrows show, in FIG. 2, the pathway followed by oil from, in this example, a buffer reservoir linked to the attached structure of the turbine engine, to the pinions and to the bearings to be lubricated. The lubrication device conventionally comprises three portions: a first portion linked to the attached structure and delivering the oil to the rotating portions of the reducer 10, a rotating wheel with the planetary carrier 13 receiving this oil in the case of a planetary gear and a distributor assembled to the planetary carrier, which are attached on a planetary architecture, and oil distribution circuits supplied with oil by the wheel to convey it to the places to be lubricated.

FIGS. 3 to 8 illustrate the example embodiment of a reducer 110 according to the invention.

The reference 130 designates the planetary carrier of the reducer 110, which is here of the one-piece type comprising a portion forming a cage 134 and a portion forming a drum 142. The cage comprises two coaxial annular walls 136, 138, connected to the periphery thereof by a cylindrical wall 140.

The annular wall 136 is integral with the substantially cylindrical drum 142, partially shown, comprising means for meshing with a fan disk of the turbine engine. The coupling means are, for example, longitudinal splines.

In the example shown, the cylindrical wall 140 is perforated and comprises through slots 143 in the radial direction, allowing mounting of the planetary carriers.

The wall 138 comprises a central opening 144 (making it possible for mounting the sun gear) centred on the axis X and a series of orifices 146 regularly distributed about the axis X, the opening 144 and the orifices 146 passing through in the axial direction (FIG. 5).

The orifices 146 are used for mounting the axes 148 of rotation of the planetary carriers 150. The axes 148 are parallel to the axis X and are mounted in the cage 134 by axial translation by passing through the orifices 146. They are attached to the longitudinal ends thereof on the walls 136, 138, respectively. Each axis 148 is integral with a smooth bearing 149 around which the planetary carrier 150 is mounted (FIG. 6). The axis 148 is hollow and comprises an inner cylindrical cavity 152. The axis 148 and the bearing 149 are passed through by at least one radial conduit (non-visible) which opens at the radially inner end thereof in the cavity 152, and at the radially outer end thereof in a longitudinal groove of the periphery of the bearing for the oil supply thereof.

As can be seen in FIG. 6, the planetary carriers 150 rotationally mounted on the axes 148 have the outer peripheries thereof, which partially pass through the slots 143 for the meshing thereof with the outer ring gear of the reducer intended to surround the cage 134.

The planetary carriers 150 mesh with the sun gear 151 which comprises inner rectilinear splines 151a for coupling to another shaft such as a turbine shaft.

A wheel 120 is attached and fixed on the wall 138, on the side of the outer surface thereof, i.e. that which is not situated on the side of the planetary carriers 150. The wheel 120 has the function of lubricating the reducer 110 and comprises lubrication means configured to bring lubricant to the nozzles 172 and to the axes 148 and bearings 149. The oil supply of the nozzles allows to lubricate the gear teeth of the planetary carriers 150 and of the sun gear 151, as will be described in more detail below in reference to FIG. 8.

The wheel 120 has a generally annular shape and comprises arms 120a radially protruding outwards, five in the example shown. The wheel 120 is intended to be mounted coaxially on the wall 138 and comprises an attachment surface 120b on this wall.

The wheel 120 comprises a central opening 120c externally delimited by an annular portion defining two annular recesses 158a, 158b, coaxial and arranged axially from one side to the other. These recesses 158a, 158b extend about the axis X and open radially inwards. The radially outer bottom wall thereof comprises orifices fluidly communicating with radial channels 160, on the one hand, and radial conduits 162, on the other hand.

Although this is not shown, the oil is intended to be projected in the recesses 158a, 158b by the means for supplying lubricant. These means generally comprise a series of injectors which are arranged about the axis X and pass through the openings 120c, 144. The injectors are carried by a stator and spray the lubricant radially outwards directly into the recesses 158a, 158b, which will then flow into the channels 160 and conduits 162.

In the example shown, the number of channels 160 is equal to the number of conduits 162 which is equal to the number of axes 148 and planetary carriers 150. This number is five here. The channels 160 are regularly distributed about the axis X and the conduits 162 are regularly distributed about the axis X, each conduit 162 being arranged between two adjacent channels 160. The conduits and channels are formed in excess thicknesses 165, 166 of the wheel (FIG. 3). The excess thicknesses 165, 166 in which are formed the channels 160 and the conduits 162 extend radially outwards from the portion wherein the recesses 158a, 158b are formed. The excess thicknesses 166 in which the conduits 162 are formed extend over the arms 120a of the wheel. It can be considered that the excess thicknesses 165 in which the channels 150 are formed, extend overfingers 120d radially protruding outwards from the wheel. The fingers 120d have a radial range less than that of the arms 120a and are each arranged between two adjacent arms.

Each of the conduits 162 communicates at the radially outer end thereof with a cavity 152 of an axis 148 for supplying lubricant from this axis 148 and from the associated bearing 149. The lubricant brought by the conduits 162 is intended to be injected into the cavities 152, then to flow through the abovementioned conduits to the periphery of the bearings 149.

Each of the channels 160 communicates at the radially outer end thereof with a longitudinal end of a nozzle 172, which can be seen in particular in FIGS. 4 and 6. The nozzles 172 have an elongate shape and extend parallel to the axis X. The axes of elongation are referenced B. There are five of them, and are regularly distributed about the axis X by each being arranged between two adjacent axes 148. Each channel 160 communicates with a cylindrical housing 160a for engaging a longitudinal end 172a of the nozzle (FIG. 7). This longitudinal end 172a comprises an outer annular recess, in which is mounted an O-ring seal which engages with the wall of the housing 160a. Each nozzle comprises an opposite longitudinal end 172b which is closed.

This longitudinal end 172a of the nozzle forms a lubricant inlet and further comprises a tab 175 for attaching to the wheel. The tab 175 is formed of a single part with the substantially tubular body of the nozzle, and it extends in a plane, substantially perpendicular to the longitudinal axis B of this body.

As can be seen in FIG. 4, the tab 175 is intended to be applied against the surface 120b of the wheel 120 or a recess 121 of this surface. The tab 175 comprises an orifice for the passage of a fixing screw, which is screwed in a tapped hole 175a of the free end of the corresponding finger 120d.

Each nozzle 172 comprises a longitudinal inner cavity 174 connected to the abovementioned lubricant inlet of the substantially radial orifices 176, distributed over the length thereof, which open into the cavity 174. The lubricant brought by the channels 160 to the nozzles 172 is intended to be sprayed through the orifices 176 on the gearings of the planetary carriers 150 and of the functioning sun gear 151 (see FIG. 8).

As can be best seen in FIGS. 4 and 8, the orifices 176 are formed in at least one boss 176a of the body of the nozzle, this boss 176a protruding radially outwards.

In the example shown, each nozzle 172 comprises two bosses 176a spaced axially from one another opposite the longitudinal axis B of the nozzle. Each boss 176a comprises six orifices 176 distributed in two rows of three regularly spaced orifices.

Each boss 176a has an angular extent β about the axis of elongation B of the nozzle, which is less than or equal to 360°, and preferably to 180° (FIG. 8). Here, it has in the transversal cross-section, a generally trapezoidal shape, of which the small base 176b is defined by the radially outer end of the boss, on which the orifices open (FIG. 8). This small base 176b has a generally convex, curved shape. The edges of the trapezium together form an angle α of between 0 and 180°, and preferably between 0 and 90°. In a variant, these edges could be substantially parallel. Finally, as can be seen in FIG. 8, the tubular wall has a wall thickness E and each boss forms an excess thickness on this wall, which is equal to E' with E' greater than or equal to E in the example represented.

The orifices 176 are oriented such that the oil is oriented towards the gearings to be lubricated. In the example represented, the orifices of each row of each boss project oil over a gearing, these orifices extending into a plane not parallel to the plane wherein the orifices of the other row extend. In the example represented, each nozzle 172 is configured to project oil over the sun gear 151 and one of the planetary carriers 150.

Each nozzle 172 is attached on the wheel 120 prior to the mounting and to the attachment of the wheel on the planetary carrier 130. The longitudinal end of each nozzle, forming a lubricant inlet, is engaged in the corresponding housing of the wheel and the tab 175 thereof is attached on the wheel as mentioned above. As also mentioned above, the tab 175 can be housed in a recess 121 of the attachment surface 120b of the wheel (FIG. 4). This recess 121 has a depth at least equal to the depth of the tab 175, such that, when the attachment surface 120b of the wheel is applied against the outer receiving surface of the second wall 138 of the planetary carrier, the tab does not impede this support. It is furthermore understood that the tabs 175 of the nozzles 172 will be confined between the planetary carrier and the wheel after the assembly of these elements. This is due to the fact that the tabs of the nozzles are inserted between the wheel and the planetary carrier.

In the mounted position of the nozzles 172 on the planetary carrier 130 shown in FIG. 4, the bosses 176a of the nozzles are oriented rather radially inwards. More accurately, as can be seen in FIG. 8, one of the edges of the boss of each nozzle can be substantially parallel to a peripheral edge of a notch 173 of the wall 138 of the planetary carrier.

The notches 173 are formed on the inner peripheral edge of the opening 144 of the planetary carrier and each have a generally triangular or trapezoidal shape to enable the mounting and movement of the boss body of each nozzle in the planetary carrier (FIGS. 5 and 6).

The base of the triangle or the large base of the trapezium of each of these notches 173 is situated at the level of the peripheral edge (FIG. 8). The tops of the triangle or of the trapezium are furthermore rounded.

FIG. 6 shows a step of mounting the wheel 120 equipped with nozzles 172 on the planetary carrier 130. The wheel is centred on the planetary carrier and moved towards it along the axis X, such that the nozzles pass through the notches 173. The receiving surface of the wall 138 comprises counterbores 177 of a generally circular shape, which are intended to receive the heads of the fixing screws 177a of the nozzles (FIG. 7), so as to enable the support of the surface 120b on this receiving surface. The screws 177a are screwed into the tapped orifices of the wheel. In this mounted position, the free ends 172b of nozzles 172 are at a small axial distance from the wall 136 of the planetary carrier.

On either side of each counterbore 177, the surface for receiving the wall 138 comprises two tapped holes 179 for screwing fixing screws 184 of the wheel. These screws 184 pass through the through orifices of the wheel, which are arranged on either side of each finger 120d (FIGS. 5 and 6).

These fixing screws 184 of the wheel on the planetary carrier improve the transmission of forces and the misalignment. With this configuration, the wheel becomes a structural part and returns some of the forces of the planetary carrier.

The advantages brought by the invention are, for example:
- the clamping function of the wheel and that of the nozzles are separate, which allows to be less statically indeterminate,
- being less statically indeterminate is also achieved thanks to the nozzle mounted in a blind housing in the first embodiment, which makes it possible to be limited to one single centring and one single O-ring,
- a geometry for the inlet of oil as close as possible to the nozzle,
- an isostatic mounting of the nozzles,
- an easy mounting of the nozzles in the wheel, then a mounting of the assembly on the planetary carrier,
- reduced machining of the wheel and of the nozzles with respect to the prior art,
- fixing screws of the captive nozzles in the first embodiment,
- no plug at the free ends of the nozzles of the first embodiment,
- less constraints in the planetary carrier,
- less misalignment of the gearings,
- slightly shorted nozzles from the attachment tabs thereof, which reduces the amplitude of the dynamic oscillations thereof.

The invention claimed is:

1. A planetary carrier for a planetary carrier speed reducer of a turbine engine, said planetary carrier comprising:
a cage defining an inner space for mounting a central sun gear of axis of rotation (X) and an annular row of planetary gears arranged about the axis (X) and meshed with said sun gear, said sun gear comprising a first coupler to couple to a first shaft, said cage comprising two substantially parallel annular walls centered on said axis (X) and a cylindrical wall connecting said annular walls at the outer periphery thereof, a first of said annular walls being integral with a substantially cylindrical drum, and a second of said annular walls on which are mounted a lubrication wheel and lubricant nozzles, the wheel comprising lubrication means comprising channels configured to bring lubricant to the nozzles and conduits to bring lubricant to bearings of the planetary gears of said reducer, said wheel being configured to be mounted coaxially on said second annular wall and comprising an attachment surface on said second annular wall, said lubricant nozzles being distributed about said axis (X) and each having an elongate shape, said nozzles comprising first longitudinal ends fluidly connecting to said channels, wherein said first ends of said nozzles engage in cylindrical housings of the channels for fluidly connecting to said channels and comprise means for attaching to said wheel, said nozzles being configured to be attached to said wheel before mounting the wheel on said second annular wall.

2. The planetary carrier according to claim 1, wherein said attachment means of each nozzle comprise a tab for attaching to said wheel, said tab extending in a plane substantially perpendicular to an axis of elongation of the nozzle and being applied and attached on said attachment surface of said wheel or a recess provided on this attachment surface.

3. The planetary carrier according to claim 1, wherein each nozzle comprises, opposite said first end, a second free end.

4. The planetary carrier according to claim 3, wherein each nozzle comprises an inner longitudinal cavity opening at said first end and closed at said second end.

5. The planetary carrier according to claim 2, wherein said second annular wall comprises a surface for receiving said attachment surface, said receiving surface comprising a recess or counterbore for housing said tab of each nozzle, or a means for attaching said tab.

6. The planetary carrier according to claim 5, wherein said second wall comprises an annular row of orifices or notches for the passage of said nozzles during the mounting of the wheel equipped with nozzles on said second wall.

7. The planetary carrier according to claim 6, wherein said orifices or said notches have a triangular or trapezoidal shape.

8. The planetary carrier according to claim 1, wherein said nozzles are attached to the wheel by screws screwed in tapped orifices of the wheel.

9. A method for assembling a planetary carrier according to claim 1, comprising:
attaching said nozzles to said wheel,
mounting the wheel equipped with nozzles on said second wall.

10. The method according to claim 9, wherein said wheel is mounted on said second wall by making said nozzles pass through notches of a triangular or trapezoidal shape.

11. The method according to claim 9, wherein said wheel is attached to said second wall by screws of which two are arranged on either side of each nozzle and are screwed in tapped holes of said second wall.

* * * * *